May 21, 1963 R. E. YOUNG 3,090,850
CONTROL APPARATUS
Filed Aug. 8, 1960

INVENTOR.
*RALPH E. YOUNG*
BY
*Williamson & Palmatier*
ATTORNEYS

United States Patent Office 3,090,850
Patented May 21, 1963

3,090,850
CONTROL APPARATUS
Ralph E. Young, Hutchinson, Minn.
Filed Aug. 8, 1960, Ser. No. 48,184
5 Claims. (Cl. 200—112)

This invention relates to control apparatus for performing a switching function in response to a predetermined detected power transmission.

An object of my invention is to provide a new and improved control apparatus of simple and inexpensive construction and operation for performing a switching function responsive to transmission of a predetermined magnitude of electrical power.

Another object of my invention is the provision of a novel apparatus which is well adapted for measuring the power load in the range of that used in a conventional household so as to perfrom a switching function to turn out large loads such as an electrical hot water heater when the remainder of the load exceeds a predetermined limit.

The still further object of my invention is the provision of an improved and novel power load measuring apparatus with a high degree of accuracy so that the supply of power to other electrical apparatus may be controlled in response to the magnitude of the load being drawn.

These and other objects and advantages of my invention will more fully appear from the following description, made in connection with the accompanying drawings, wherein like reference characters refer to the same or similar parts throughout the several views, and in which.

Figure 3:
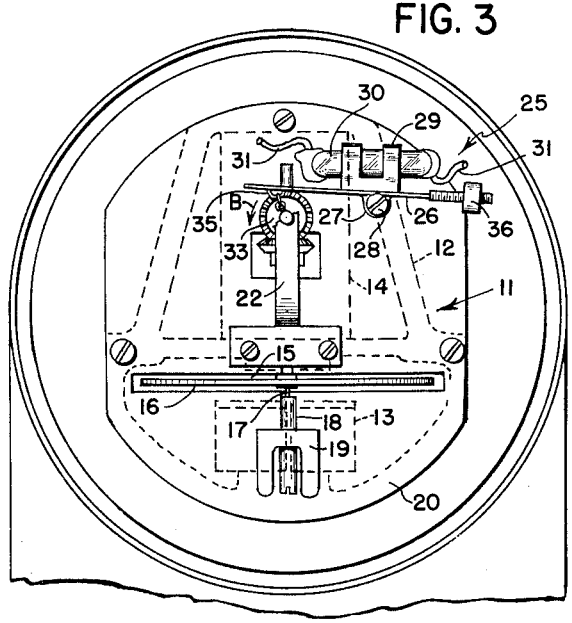
FIG. 3 is a front elevation view of the apparatus of the present invention.
Figure 4:
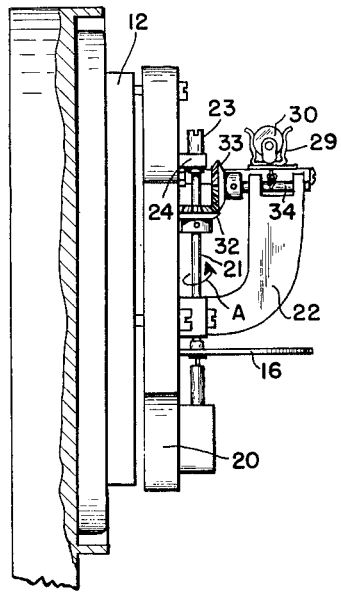
FIG. 4 is a left side elevation of the apparatus shown in FIG. 3.

One form of the present invention is shown in the drawings and is described herein. The control apparatus is indicated in general by numeral 10 and includes a mechanism 11 for producing a mechanical movement or an indication of the magnitude of power being conducted or transmitted through a power line. The mechanism 11 is the same type of mechanism commonly employed in watthour meters employed in homes for measuring the electrical energy consumed. The mechanism 11 includes a core structure 12 shown in dotted lines in FIG. 3 and having a current coil 13 wound thereon and also having a voltage coil 14 wound thereon. The core structure 12 is constructed in the usual fashion of a watthour meter core structure of laminated iron or other high mu material and has pole tips or pole portions arranged in spaced and generally confronting relation with each other so as to define a slot area 15 to receive a wide portion of a rotatable aluminum disc 16. The disc 16 is freely rotatable in both directions and is supported on a pointed bearing stem 17 which lies on the rotation axis and is supported on a bearing 18 which may be threaded through a mounting portion 19 of frame 20. A rotary shaft 21 is affixed to the disc 16 and extends upwardly therefrom through a suitably provided bearing aperture in the inner end of frame member 22. The upper end of shaft 21 is reecived in an opening or bearing recessed in a stationary bearing element 23 which is mounted on a fixed ledge 24 of frame 20.

Thus far the mechanism 11 is identical to the indication producing mechanism of a conventional watthour meter for measuring the consumption of electrical energy transmitted through the power line. The mechanism 11 may be identical to that provided in the watthour meters produced and sold by the Duncan Electric Manufacturing Company, Lafayette, Indiana, and may include the various structural details necessary for producing full load speed adjustment of the disc, light load speed adjustment, inductive load adjustment, overload compensation, voltage compensation, frequency compensation, and temperature compensation. It will be understood that in the mechanism 11 when the voltage of the power line is applied across the voltage coil 14 and when the current supplying the load flows through the curent coil 13, a torque or force is caused to be applied on the disc tending to rotate the disc 16 and shaft 21 in the direction of arrow A. The torque applied to the disc 16 varies in proportion to the power being transmitted to the load so that when the load is small, the torque applied is likewise small and when the load is of a substantial magnitude the torque applied to the disc will also be of a substantial magnitude.

The apparatus 10 also includes a mechanism 25 for producing a switching operation in response to a predetermined torque exerted on the disc and therefore in response to the power being transmitted to the load.

The mechanism 25 includes a tiltable carriage 26 oriented in a substantially horizontal position and having a sleeve bearing 27 affixed thereto in underlying relation and being mounted on a pivot screw 28 which is affixed in the frame 20. As viewed in FIG. 3 the carriage 26 is tiltable for raising and lowering the opposite ends thereof. A mercury tube-supporting bracket 29 is affixed on the carriage 26 in substantially centered relation above the pivot axis and a mercury tube switch 30 is carried in the bracket. Conductors 31 extend from the opposite ends of the mercury tube switch 30 for connection in a circuit as hereinafter described.

The shaft 21 has a bevel gear 32 affixed thereon and meshed with another bevel gear 33 which is affixed to another rotary element or shaft 34. The shaft 34 is mounted in bearing apertures in the bifurcated upper portion of the frame member 22. A plurality of links 35 interconnect the shaft 34 and the carriage 26, one of said links being affixed to the shaft to rotate therewith another of the links being affixed to the carriage, and still another of the links interconnecting the other two links. When the shaft 34 is revolved in the direction of arrow B, the adjacent end of the carriage 26 is pulled downwardly and may move through an arc sufficient to cause the mercury in the tube 30 to effect a switching operation. The upper end of the frame member 22 will abut the carriage 26 to limit the downward movement of the end of the carriage. The linkage 35 limits the upward movement of the end of carriage 26.

The carriage 26 is provided with an adjustable counterweight 36 on its outer end to restrain tilting of the carriage and the mercury switch and to restrain rotation of the disc 16. By adjusting the counterweight 36, the force necessary to tilt the mercury switch into operating condition will be varied. If the counterweight 36 is adjusted outwardly away from the pivot of the carriage, the force needed to tilt the carriage is increased and therefore more torque must be applied to the disc 16 in order to effect switch operation. It will therefore be necessary that substantially more power be transmitted to the load before the switching operation is effected.

Figure 1:
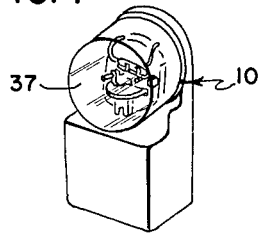
FIG. 1 is a general perspective view of the apparatus.

As shown in FIG. 1, a tamper-proof cover 37 of glass or other material may be emplaced over the apparatus 11 and 25.

Figure 2:
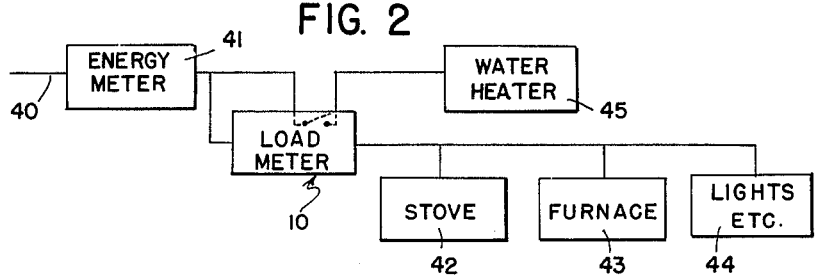
FIG. 2 is a diagrammatic block diagram showing an application of the present invention.

The present invention is particularly well adapted for use in reducing the peak loads drawn by switching out major loads such as water heaters in a home at the time when the load being drawn by other appliances is particularly heavy. As seen in FIG. 2, power is supplied through a main bus 40 through a conventional one hour meter 41 for the various loads in a house. The voltage applied to, and current drawn by, the stove 42, furnace 43, lights and miscellaneous circuits 44 are also applied to the coils 13 and 14 of the apparatus 10. When the load drawn by these several circuits 42–44 exceeds a predetermined limit, the mercury switch 30 is opened to cut out the water heater 45 so as to reduce the power requirements, substantially at the time that the power company experiences its peak load. It will be understood from the foregoing description that the factor which determines the maximum load before the switch 30 is opened, is the position of the counterweight 36 which restrains tilting of the carriage and restrains rotation of the disc so as to require more force or torque to be applied to the disc.

It will be understood that when the power being drawn by the circuits 32–34 and transmitted through the apparatus 10 is decreased beyond the predetermined limit, the counterweight 36 will cause the carriage 26 to tilt in a clockwise direction and to again close the switch 30 so that the water heater may be operated. This clockwise tilting is permitted when less torque is applied to the disc 16 as a result of decreased power transmitted.

It should be understood that the block circuit diagram shown in FIG. 2 is meant to show only a typical arrangement which may be used. In the arrangement shown in FIG. 2, all of the energy used is to be measured by the single energy meter 41. It should be understood that other arrangements may be used such as to measure the energy consumed by the water heater in a meter separate from a second meter which will be used to measure the energy consumer by the stove, furnace, lights, etc.

It will, of course, be understood that various changes may be made in the form, details, arrangement and proportions of the parts without departing from the scope of our invention which consists of the matter shown and described herein and set forth in the appended claims.

What is claimed is:

1. A control device having in combination, an electrical power measuring apparatus of the type including a rotatable disc and a core and coil structure having a voltage coil and a current coil causing application to said disc of a torque proportional to the electrical power transmitted and related to the voltage impressed upon the voltage coil and the current flowing through the current coil, a mechanical linkage connected with the disc to operate as the disc is turned, a tiltable carriage having a mercury switch thereon to be tilted with the carriage to perform a switching operation, said carriage being connected with said linkage to prevent rotation of the disc, but permit limited turning of the disc whereby to be tilted as the disc is turned and thereby operate the switch.

2. A control device having in combination, an electrical power measuring apparatus of the type including a rotatable disc and a core and coil structure having a voltage coil and a current coil causing application to said disc of a torque proportional to the electrical power transmitted and related to the voltage impressed upon the voltage coil and the current flowing through the current coil, a mechanical linkage connected with the disc to operate as the disc is turned, a carriage movable away from a starting position, and being connected with said linkage to be moved as the disc is turned, means connected with the carriage to restrain movement thereof and to return the carriage to starting position and to also return said disc to starting position and the torque is removed, and switch means to be operated by movement of the carriage away from starting position.

3. Apparatus for performing a switching function in response to transmission of a predetermined magnitude of electrical power, said apparatus comprising electrical power measuring mechanism including a rotatable disc and a magnetic core and coil structure having a voltage coil and a current coil cooperatively applying to said disc a torque proportional to the electrical power related to the voltage applied to the voltage coil and the current flowing through the current coil for causing the disc to turn, a mechanical linkage connected with the disc to operate as the disc is turned, a tiltable carriage having a mercury switch thereon to be tilted with the carriage to perform a switching operation, a counterweight on the carriage to restrain tilting of the carriage, and said carriage being connected with said linkage to restrain turning of the disc and also to be tilted as the disc is turned whereby to operate the switch.

4. Apparatus for performing a switching function in response to transmission of a predetermined magnitude of electrical power, said apparatus comprising an electrical power measuring mechanism including a rotatable disc and a magnetic core and coil structure having a voltage coil and a current coil cooperatively applying to said disc a torque proportional to the electrical power related to the voltage applied to the voltage coil and the current flowing through the current coil for causing the disc to turn, said disc being freely rotatable in both directions, a mechanical linkage connected with the disc to operate as the disc is turned, a tiltable carriage having a mercury switch thereon to be tilted with the carriage to perform a switching operation, a counterweight on the carriage and restraining tilting thereof, said carriage being connected with said linkage to be tilted as the disc is turned under the influence of said torque, and said counterweight restraining tilting of the carriage and turning of the disc and causing the disc to return in the opposite direction of the applied torque when the coil current is reduced.

5. A control device having in combination, an electrical power-measuring apparatus of the type including a horizontally oriented rotatable disc having an upright axis, and a core and coil structure having a voltage coil and a current coil respectively arranged above and below the disc to cause application to said disc of a torque proportional to the electrical power transmitted and related to the voltage impressed upon the voltage coil and the current flowing through the current coil, a rotary shaft affixed to the center of the disc, a rotary element adjacent said shaft, gear means interconnecting such shaft and rotary element, a generally horizontally oriented carriage, a horizontal pivot stud underlining said carriage and mounting the carriage to permit tiltable oscillation thereof raising and lowering the opposite ends of the carriage, one end of the carriage being disposed above said rotary element being connected thereto by a plurality of mechanical links to be moved downwardly as the rotary element is revolved, the other end of the carriage having an adjustable counterweight thereon to restrain tilting of the carriage and to return the carriage when the coil current is reduced, and a mercury switch secured on the carriage and oriented transversely of said pivot in order to perform a switching operation as the carriage is tilted.

References Cited in the file of this patent

UNITED STATES PATENTS

| | | |
|---|---|---|
| 2,304,024 | Schellentrager | Dec. 1, 1942 |
| 2,557,681 | Ostlind et al. | June 19, 1951 |
| 2,958,016 | Cavagnaro et al. | Oct. 25, 1960 |